Jan. 13, 1970   F. J. PASSARELLI   3,488,802
PLASTIC FORMING APPARATUS
Filed Aug 29, 1966   3 Sheets-Sheet 2
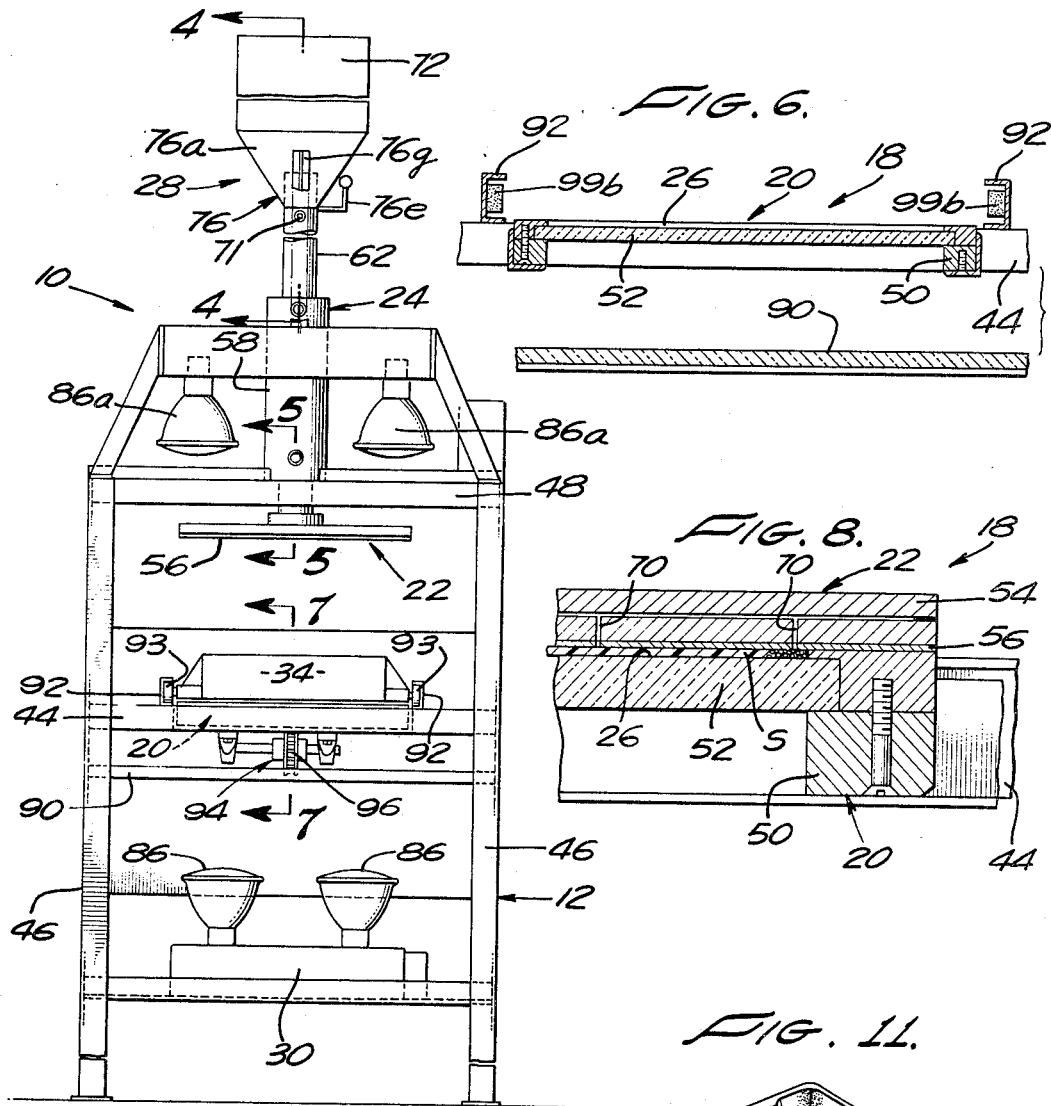
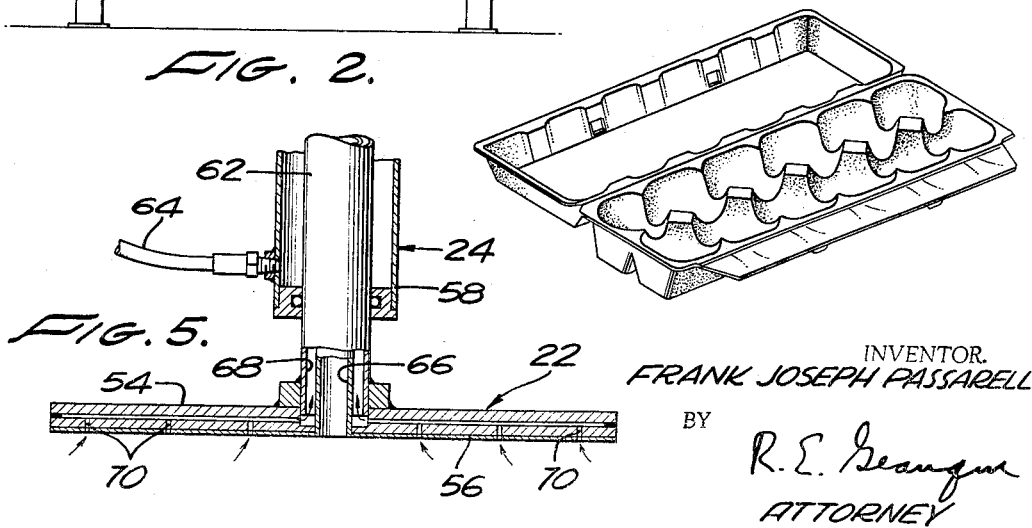
INVENTOR.
FRANK JOSEPH PASSARELLI
BY
R. E. Geanger
ATTORNEY

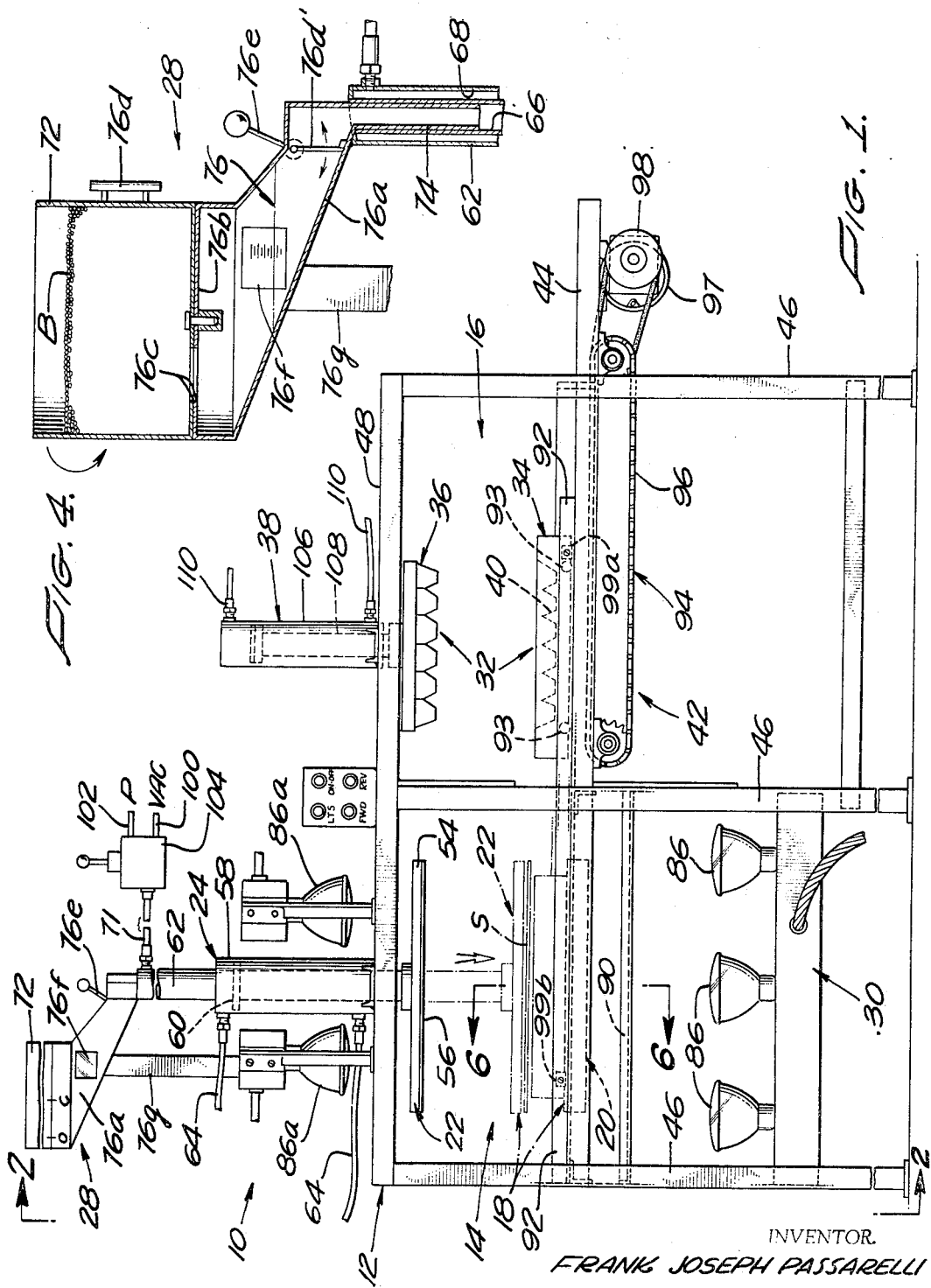

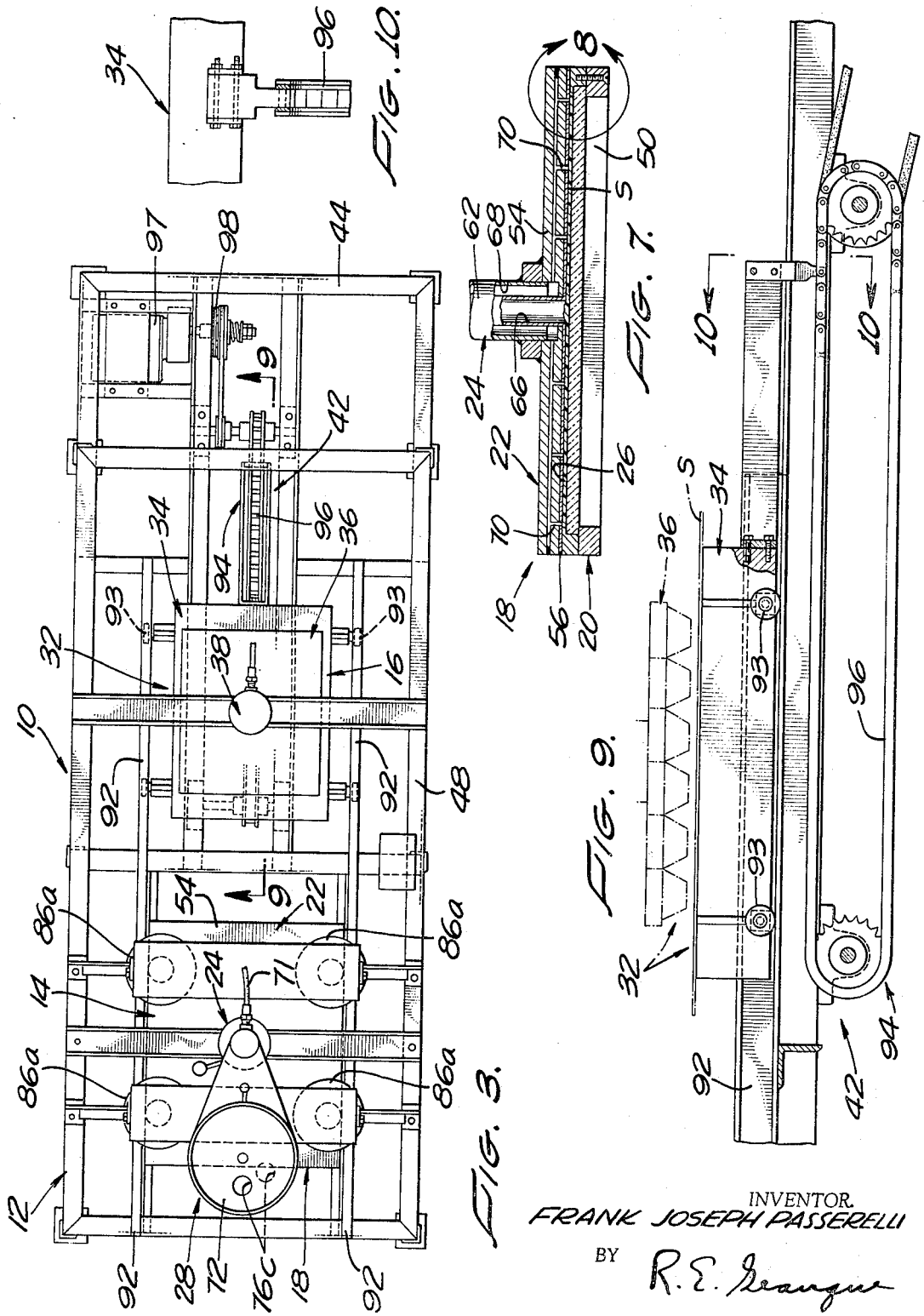

United States Patent Office 3,488,802
Patented Jan. 13, 1970

3,488,802
PLASTIC FORMING APPARATUS
Frank Joseph Passarelli, 10924 Ohio Ave.,
West Los Angeles, Calif. 90024
Filed Aug. 29, 1966, Ser. No. 575,590
Int. Cl. B29c 1/00
U.S. Cl. 18—5                                      10 Claims

ABSTRACT OF THE DISCLOSURE

Apparatus for molding to a final shape a granular thermoplastic material such as polystrene plastic beads. The molding apparatus has an initial flat mold cavity wherein the plastic material is initially heated to its fusion temperature to produce a plastic sheet which is then transferred to and molded to final shape in a final mold cavity.

---

This invention relates generally to the plastic molding or forming art. More particularly, the invention relates to a novel plastic forming apparatus.

According to one of its important aspects, the invention provides a novel apparatus for molding or forming articles from plastic material which is supplied in bead form. One example of such a plastic material is polystyrene which is available in both unexpanded and pre-expanded bead form.

The present plastic forming apparatus is particularly suited for forming articles from such polystyrene plastic beads and may utilize either the unexpanded or the pre-expanded beads. Accordingly, the invention will be described in connection with this particular plastic material. As will appear from the ensuing description, however, the invention may be practiced with other plastic materials which are supplied in bead form and may utilize plastic which is initially in sheet form. Accordingly, the invention should not be considered as limited in application to polystyrene beads.

According to the conventional methods of forming polystyrene plastic beads into a finished article, the beads are placed in a mold cavity having the shape of the final article. The beads are then fused within the cavity by the application of heat, thus resulting in a final molded article having the shape of the cavity.

This method of forming molded polystyrene articles has certain disadvantages, particularly when applied to the formation of relatively intricate thin-walled articles. One of the major disadvantages resides in the fact that uniform distribution and fusion of the polystyrene beads throughout the mold cavity is often difficult or impossible to achieve. Unless such uniform distribution and fusion of the beads is accomplished, of course, the final molded article may have weak spots, portions which are improperly or incompletely formed, or may be otherwise defective. Uniform distribution of the plastic beads throughout the mold cavity is difficult to accomplish for the reason that the internal cavity formations, particularly if they are intricate or define restricted openings, obstruct free and uniform passage of the beads to all portions of the cavity. Uniform heating of all of the plastic beads in the mold cavity is difficult to achieve owing to the varying wall thickness of most plastic forming molds which results from the mold cavity shape. Such varying wall thickness tends to cause non-uniform heat transfer to the plastic beads in different portions of the mold cavity.

Another deficiency of the existing methods and apparatus for molding or forming plastic beads, particularly polystyrene plastic beads, into finished articles resides in the fact that the beads are heated by thermal conduction through the walls of the mold cavity. This conductive method of heat transfer is comparatively slow, renders difficult uniform heating of the plastic beads to the proper fusion temperature owing to the varying wall thickness of the cavity, and requires a relatively massive high capacity heat source. One common method of fusing polystyrene plastic beads in a mold cavity, for example, involves the use of steam and thus requires a heat generating facility and means for conveying the steam to and from the mold.

The existing methods and apparatus for fusing and molding plastic beads, particularly polystyrene plastic beads, into finished articles are thus ill-suited to forming many shapes. For example, numerous unsuccessful attempts have been made to utilize the existing plastic forming methods and apparatus for molding relatively intricate, thin-walled shapes, such as egg cartons. It is evident, of course, that polystyrene, because of its cushioning characteristics, is ideally suited to this application. A plastic forming method and/or apparatus which would permit the molding of such shapes, particularly egg cartons, from plastic which is supplied in bead form would thus represent a highly important advance in the art.

The present invention provides a novel apparatus for forming finished articles from plastic beads, such as polystyrene plastic beads, which avoid the above-noted and other deficiencies of the existing plastic forming methods and apparatus for this purpose. According to the invention, the plastic beads are initially fused into a sheet within a generally flat initial mold cavity, and the final article is produced by forming this sheet within a final mold cavity. The generally planar shape of the initial mold cavity permits uniform distribution of the plastic beads throughout the cavity as well as uniform heating and fusion of the beads in the cavity. A further important aspect of the invention is concerned with a unique mold construction which may be employed to define the flat initial mold cavity and accommodates rapid, efficient, and uniform fusion of the beads to sheet form in the initial mold cavity by a simple, low-cost radiant heat source, such as incandescent lamps or infrared lamps. As will appear presently, however, this novel mold construction may be used to fuse plastic beads into any desired shape.

A unique feature of the invention resides in the fact that the heat source for initially fusing the plastic beads into a sheet is thereafter utilized for maintaining the sheet in a soft plastic state suitable for forming to a desired final shape. According to the invention, the plastic sheet is transferred to and formed to the desired final shape in the final mold cavity while the sheet is still in its soft plastic state. The difficulties, discussed above, attendant to the existing plastic forming methods and apparatus which involve fusion and forming of the plastic beads within a single mold cavity having the desired shape of the final article are thus avoided.

The present plastic forming apparatus is uniquely constructed to accomplish the above plastic forming method in a simple, rapid and efficient manner. To this end, the apparatus is equipped with a frame mounting a first mold defining the initial flat mold cavity, means for introducing plastic beads into this cavity, a heat source for fusing the beads into a sheet within the cavity and maintaining the sheet in a soft plastic state, a second mold defining the final mold cavity which conforms to the desired shape of the finished article, and means for transferring the plastic sheet from the initial mold cavity to the final mold cavity and forming the sheet in the latter cavity while the sheet is still in its soft plastic state. The apparatus may be automated to proceed repeatedly through its plastic forming cycle without manual control.

As will appear from the ensuing description, while the invention proposes fusing of plastic beads into a sheet within the initial flat mold cavity, the apparatus may utilize a preformed plastic sheet which is merely heated to the required soft plastic state within the initial mold cavity. Also, as noted earlier, the novel initial mold construction of the invention may be utilized for other molding applications.

A general object of the invention, therefore, is to provide a novel plastic forming apparatus wherein a plastic sheet is heated to a soft plastic forming state within an initial flat mold cavity and is then immediately transferred to and formed to a final shape within a final mold cavity while in this plastic state.

A highly important object of the invention is to provide a plastic forming apparatus of the character described wherein the plastic sheet is molded directly in the initial mold cavity by fusing plastic beads within the latter cavity, whereby the problems normally attendant to fusing and molding plastic beads within a mold cavity having the shape of the final article are avoided.

Another object of the invention is to provide a plastic forming apparatus of the character described which is particularly suited for forming articles from polystyrene plastic beads.

A further highly important object of the invention is to provide a novel mold construction, for use in the present plastic forming apparatus, which permits rapid and uniform fusion of plastic beads to any desired shape with the aid of a radiant heat source, such as heat lamps or the like.

Other objects, advantages and features of the invention will become readily evident as the description proceeds, taken in conjunction with the accompanying drawings in which:

FIGURE 1 is a front elevation of a plastic forming machine according to the invention;

FIGURE 2 is an end view of the machine looking in the direction of arrows on line 2—2 in FIGURE 1;

FIGURE 3 is a top plan view of the machine;

FIGURE 4 is an enlarged section taken on line 4—4 of FIGURE 2;

FIGURE 5 is an enlarged section taken on line 5—5 of FIGURE 2;

FIGURE 6 is an enlarged section taken on line 6—6 of FIGURE 1;

FIGURE 7 is an enlarged section taken on line 7—7 in FIGURE 2 and illustrating the separable sections of the initial mold in their closed positions;

FIGURE 8 is an enlargement of the area enclosed by the circular arrow 8 in FIGURE 7;

FIGURE 9 is an enlarged section taken on line 9—9 in FIGURE 3;

FIGURE 10 is a section taken on line 10—10 in FIGURE 9; and

FIGURE 11 is a perspective view of a molded plastic article, i.e. an egg carton, produced by the illustrated forming machine.

In general terms, the plastic forming apparatus 10 10 of the invention which has been selected for illustration in these drawings comprises a frame 12 having an initial forming and/or heating station 14 and a final forming station 16. Located at the initial station 14 is a first or initial mold 18 having separable mold sections 20 and 22 and operating means 24 for effecting relative movement of these mold sections between their open and closed positions. In their closed positions, the mold sections 20 and 22 define a flat mold cavity 26. Associated with the mold 18 are plastic bead supplying means 28 for supplying fusible thermoplastic beads to the mold cavity 26 and a heat source 30 for heating the beads in the cavity to the fusion temperature. The plastic beads, when fused, form within the mold cavity 26 a plastic sheet S which is maintained in a soft plastic forming state by the heat source 30.

Located at the final forming station 16 is a second or final mold 32 including separable mold sections 34 and 36 and operating means 38 for effecting relative movement of the latter mold sections between their open and closed positions. Mold sections 34, 36 when closed, define a final mold cavity 40 having a shape corresponding to the desired shape of the final plastic article. The particular final mold cavity 40 illustrated is shaped to form egg cartons of the kind shown in FIGURE 11.

After fusing of the plastic beads within the initial mold cavity 26, the resulting plastic sheet S, while still in its soft plastic forming state, is transferred to the final mold cavity 40 and is formed in the latter cavity to the desired final shape. To this end, the illustrated plastic forming apparatus 10 is equipped with transfer means 42 for effecting transfer of the plastic sheet S, in its soft plastic state, from the initial mold cavity 26 to the final mold cavity 40. This transfer involves separation of the initial mold sections 20, 22 in such a way that the plastic sheet adheres to one of these sections, relative movement of said one initial mold section and one section of the final mold 32 to positions opposite one another, transfer of the plastic sheet to the latter final mold section, return of the mold sections to their normal positions, and forming of the plastic sheet in the final mold cavity 40, all while the sheet is still in a soft plastic state.

Referring now in greater detail to the plastic forming apparatus 10, the frame 12 comprises a normally horizontal work table 44 supported on upright legs 46. Rigidly mounted over the work table 44 is an upper horizontal platform 48.

The separable mold sections 20 and 22 of the initial mold 18 comprise lower and upper mold sections, respectively. The lower mold section 20 comprises an open rectangular frame 50 which is rigidly mounted in a horizontal position on the frame table 44. Extending across and perimetrically attached to this mold frame is a transparent plate 52 constructed of glass or other suitable transparent material. The frame 50 and transparent plate 52 together define the major portion of the initial mold cavity 26, the frame forming the side walls of the cavity and the plate forming the bottom wall of the cavity. It will be observed that the mold cavity 26 is relatively shallow and opens upwardly.

The upper section 22 of the initial mold 18 comprises a rectangular metal plate 54 having approximately the same dimensions as the mold frame 50. Secured to the underside of the plate 54 is a reflective sheet 56 constructed of copper or other material capable of reflecting radiant heat, as described below. In the closed positions of the mold sections 20, 22 the reflective sheet 56 of the upper mold section seats on the upper surface of the lower mold frame 50, about the mold cavity 26, in such a way as to form a substantially airtight seal between the mold sections. In these closed positions of the mold sections, the upper mold section 22 closes and defines the upper wall of the mold cavity 26.

The mold operating means 24 at the initial forming station 14 of the apparatus 10 comprises a pneumatic ram including a cylinder 58, the lower end of which is bolted or otherwise rigidly attached to the upper frame platform 48. Slidable in the cylinder 58 is a piston 60 fixed to a piston rod 62. The ends of the piston rod 62 extend through and are slidably sealed to the end walls of the cylinder 58. The lower end of the piston rod 62 is attached to the center of the upper section 22 of the initial flat mold 18. Extending from the ends of the cylinder 58 are hoses 64 through which the cylinder ends may be selectively vented and connected to a source of pressurized air. It is evident at this point, therefore, that the upper movable section 22 of the initial mold 18 may be moved vertically between its open and closed position relative to the lower stationary mold section 20 by selectively pressurizing and venting the ends of the ram cylinder 58 through the cylinder hoses 64.

Extending axially through the piston rod 62 is a central bore 66 and a surrounding annular passage 68.

The lower end of the central bore 66 opens through the underside of the upper section 22 of the initial mold 18. The upper end of the bore opens through the upper end of the piston rod 62. The lower end of the outer, annular piston rod passage 68 communicates with a number of small air passages 70 which open through the underside of the upper mold section 22, as shown. The upper end of the passage 68 communicates to a hose 71.

The plastic bead supplying means 28 include a bin or hopper 72 located above the upper frame platform 48 for containing a supply of the plastic beads B to be molded. Hopper 72 is rigid on and has its interior in communication with the central passage through a tube or sleeve 74 which slides in the central bore 66 of the piston rod 62. Positioned between the hopper 72 and the sleeve 74 is a gate mechanism 76 for gating movement of the plastic beads B from the hopper 72 to the sleeve 74. Any conventional gate mechanism may be employed for this purpose. The illustrated gate mechanism 76 comprises an inclined metering chamber 76a which opens at its lower end to the upper end of the central passage through the sleeve 74. The upper end of the metering chamber is closed by a wall 76b on which the bead hopper 72 is rotatably mounted. Extending through the bottom wall of the hopper and the upper wall 76b of the metering chamber are ports 76c which may be aligned to permit the plastic beads B to pass from the hopper to the metering chamber by rotation of the hopper to an open position. Flow of beads from the hopper to the chamber is cut off by rotation of the hopper from its open position to a closed position in which the ports 76c are misaligned. A handle or knob 76d is provided on the hopper for turning the latter between its open and closed positions, these positions being indicated by the legends "O" and "C" in FIGURE 1. At the lower end of the metering chamber is a flapper 76d which is normally closed, as shown, to block the flow of beads B from the chamber to the sleeve 76. Flapper 76d has a handle 76e by which the flapper may be opened to pass beads from the metering chamber to the sleeve. In the wall of the metering chamber is a sight glass 76f through which the bead level in the chamber may be observed. The sight glass is calibrated to indicate the volume of beads in the chamber, as hereinafter explained.

Extending between the upper frame platform 48 and the wall of the metering chamber 76a is a strut 76 which rigidly supports the chamber on the platform. Accordingly, the hopper 72, metering chamber 76a and sleeve 74 remain stationary and the sleeve slides in the ram piston rod 62 during axial movement of the rod to open and close the initial mold 18.

As explained in detail presently, the gate mechanism 76 is utilized to charge the initial mold cavity 26 with a measured volume of the plastic beads B at the outset of each operating cycle of the present forming apparatus. The beads are then heated to the fusing temperature within the cavity by means of the heat source 30, thus to form the plastic sheet S.

The present plastic forming apparatus may utilize various types of heat sources. The heat source 30 of the illustrated apparatus 10 is a radiant heat source including a number of heat lamps 86 which are preferably incandescent lamps, but may comprise infrared lamps. Heat lamps 86 are mounted on the machine frame 12, directly below the initial mold 18. These heat lamps are effective to transmit radiant heat upwardly through the lower transparent plate 52 of the lower mold section 20 of the initial mold into the initial mold cavity 26. Radiant heat which strikes the reflective sheet 56 on the upper section 22 of the initial mold is reflected back into the mold cavity 26. Preferably, a transluscent diffuser plate 90 is mounted directly above the heat lamps 86, to diffuse the radiant heat transmitted from the lamps to the initial mold cavity 26.

The separable sections 34 and 36 of the final mold 32 comprise lower and upper mold sections, repectively. The lower mold section 34 is mounted on the frame table 44 for horizontal movement between its solid line normal position of FIGURE 1 within the final forming station 16, and a transfer position, illustrated in broken lines in FIGURE 1, within the initial forming station 14. The mold section 34 may be movably mounted on the frame table 44 in any convenient way. In the particular plastic forming apparatus 10 illustrated, for example, the frame table 44 mounts a pair of channel-shaped tracks 92 which extend between the forming stations 14, 16 and receive rollers or wheels 93 on the mold section 34. These wheels ride along the tracks 92 during movement of the mold section 34 between its normal and transfer positions. Mold section 34 is driven between these positions by an actuator 94 on the machine frame 12. The illustrated actuator comprises an endless sprocket chain 96 which is attached to the lower mold section 34 in the manner shown in FIGURE 10 and is driven by a reversible motor 97 through a slip clutch 98. Energizing of the motor in one direction drives the mold section 34 to the right in FIGURE 1 and toward its normal position. Energizing of the motor in the opposite direction drives the mold section to the left toward its transfer position. Stops 99a, 99b are provided for arresting the lower mold section in its normal and transfer positions, respectively. Arresting of the lower mold section in either position causes the sprocket chain drive clutch 98 to slip until the motor 97 is deenergized.

The above means for driving the lower section 34 of the final mold 32 between its normal and transfer positions form part of the transfer means 42 for transferring the plastic sheet S from the initial mold 18 to the final mold. The transfer means 42 further comprise a vacuum source 100, a pressurized air source 102 and a valve 104 for selectively communicating either source to the annular passage 68 in the ram piston rod 62 for the initial mold and isolating both sources from the passage. To this end, the valve 104 has two inlets communicating with the sources 100, 102, respectively, and an outlet communicating with the passage 68 through the hose 71. As will be explained shortly, after fusing of the plastic beads B in the initial mold cavity 26 to form the plastic sheet S, the valve 104 is positioned to communicate the vacuum source 100 to the piston rod passage 68 and the upper initial mold section 22 is raised to its solid line open position of FIGURE 1, thus to elevate the sheet S from the initial mold cavity. The lower section 34 of the final mold 32 is then driven to its transfer position, and the plastic sheet S is deposited on the latter mold section by lowering the initial mold section 22 to its broken line position of FIGURE 1 and positioning the valve 100 to communicate the pressurized air source 102 to the piston rod passage 68, thus to force the sheet from the upper initial mold section onto the underlying lower final mold section. In this regard, it is significant to note that the final mold section 34, when in its transfer position, is located directly over the lower initial mold section 20 and directly below the upper initial mold section 22, whereby the final mold section is disposed to receive the plastic sheet S from upper initial mold section in the manner just explained. After the sheet has been deposited on the final mold section 34, the latter is returned to its normal position at the final forming station 16.

At this point, attention is directed to the fact that the vacuum source 100 and valve 104 are also utilized at the start of each operating cycle of the present forming apparatus to aid the charging of the initial mold cavity 26 with plastic beads B from the metering chamber 76a. Thus, as will be explained presently, at the outset of each cycle, the initial mold 18 is closed and the valve 104 is positioned to communicate the vacuum source 100 to the cavity 26 through the piston rod passage 68 and the passage 70 in the upper initial mold section 22. The mold cavity 26 is thereby evacuated to induce movement of the beads B from the metering chamber 76a to the cavity when the flapper 76d is opened.

The upper section 36 of the final mold 32 is movable vertically between open and closed positions relative to the lower mold section 34. The upper mold section is driven between these positions by the operating means 38. These operating means comprise a pneumatic ram including an upright cylinder 106 which is bolted or otherwise rigidly attached to the upper frame platform 48, directly over the center of the final mold 32. Movable in this cylinder is a piston fixed to a piston rod 108, the lower end of which is attached to the upper mold section 36. At the ends of the cylinder 106 are hoses 110 through which the ends of the cylinder may be selectively pressurized and vented.

At the outset of each plastic forming cycle of the illustrated plastic forming apparatus 10, the upper end of the initial mold ram cylinder 58 is pressurized to lower the upper initial mold section 22 to its closed position of sealing engagement with the lower initial mold section 20. The valve 104 is then positioned to communicate the vacuum source 100 to the initial mold cavity 26 through the hose 71, the piston rod passage 68 and the passages 70 in the upper initial mold section 22, thus to evacuate the initial mold cavity 26. Thereafter, the gate 76 of the plastic bead supplying means 28 is operated to admit or gate a predetermined quantity of the plastic beads B from the hopper 72 into the initial mold cavity 26. It will be understood, of course, that the vacuum created in the initial mold cavity will suck the beads from the gate into the cavity through the sleeve 74 and the central bore or passage 66 in the ram piston rod 62 when the gate flapper 76d is opened. As noted earlier, the present invention is particularly suited to utilize polystyrene plastic beads of either the pre-expanded or unexpanded variety. In the event that pre-expanded polystyrene beads are utilized, the gate 76 is operated to admit to the initial mold cavity a quantity of the beads B which will just fill the cavity. In the event that unexpanded polystyrene beads are employed, the upper section 22 of the initial mold 18 may be spring loaded to accommodate the expansion of these beads which occurs during the fusion process, described below. The arrangement of the passages 70 in the upper initial mold section 22 is made such as to induce uniform distribution of the entering plastic beads to all portions of the initial mold cavity 26.

At this point, it is significant to recall that operation of the illustrated plastic bead gate 76 involves rotation of the bead hopper 72 to its open position to admit a measured quantity of beads B from the hopper to the metering chamber 76a and subsequent opening of the gate flapper 76d to permit the beads to pass from the chamber to the initial mold cavity 26. Admission of the correct quantity of beads into the metering chamber is accomplished by observing the bead level in the chamber through the sight glass 76f and rotating the hopper 72 to its closed position, to cut off the flow of beads from the hopper to the metering chamber, when the bead level rises to the proper calibration line on the sight glass. In this regard, attention is directed to the fact that the present forming apparatus may be constructed to permit replacement of the initial and final molds 18, 32, thus to enable molded articles of various shapes and sizes to be formed. These different initial molds may have initial mold cavities of different volumes. In this case, the metering chamber sight glass 76f will be calibrated to permit charging of each initial mold cavity with the correct quantity of plastic beads from the hopper 72.

The plastic beads B introduced into the initial mold cavity 26 are heated to their fusion temperature by the heat lamps 86. The plastic beads are thereby fused to one another to form the molded plastic sheet S within the cavity. Preferably, the upper section 22 of the initial mold 18 is also heated by additional heat lamps 86a located above the latter mold section, thus to aid and accelerate uniform fusion of the plastic beads.

At this point, it is significant to note in connection with the illustrated plastic forming apparatus 10 that the plastic beads in the initial mold cavity 26 are heated by radiant heat transfer from the heat lamps 86. Thus, the radiant heat from the lamps is transmitted upwardly through the lower transparent wall 52 of the initial mold cavity directly into the mass of beads within the cavity. Moreover, the radiant heat incident on the beads is reflected from and transmitted through the beads, from bead to bead. In addition, any radiant heat which passes entirely through the mass of beads within the cavity impinges the lower reflective sheet 56 on the upper initial mold section 22 and is then reflected back into the mass of beads within the cavity. This direct transmission of radiant heat from the heat lamps 86 into the mass of beads within the initial mold cavity 26, reflection and transmission of the radiant heat from and through the beads and from the reflective sheet 56, and the thin uniform planar shape of the initial mold cavity cooperate to produce rapid and uniform fusion of all the beads within the cavity. It is obvious at this point, therefore, that fusion of the plastic beads B to sheet form within the initial flat mold cavity 26 avoids the problems, discussed earlier, attendant to simultaneous fusion and forming of the plastic beads to a final shape within the same mold cavity, as occurs in the existing plastic forming methods and apparatus for this purpose. In addition to initially fusing the plastic beads B into sheet form, the heat lamps 86, 86a retain the resulting molded plastic sheet S in a soft plastic forming state.

The next phase of the plastic forming cycle of the illustrated plastic forming apparatus 10 involves operation of the transfer means 42 to transfer the plastic sheet S, while still in its soft plastic state, from the initial mold cavity 26 to the final mold cavity 40. This transfer is accomplished by positioning the valve 104 to again communicate the vacuum source 100 to the passages 70 within the upper initial mold section 22. Evacuation of the passages 70 causes the plastic sheet S to adhere to the upper mold section. The lower end of the initial mold ram cylinder 58 is then pressurized to raise the mold section 22 to its open position. The plastic sheet, which now adheres to the upper mold section, is thereby raised out of the initial mold cavity 26. It has also been found that if the heat lamps 86 and 86a are arranged in such a way that the upper mold section 22 is heated to a temperature which slightly exceeds the temperature of the lower mold section 20, the plastic sheet will inherently tend to adhere to the upper mold section, thus aiding the vacuum grip on the sheet. In some cases, the inherent adhesive force between the plastic sheet and the upper mold section may be sufficient to cause the sheet to adhere to the upper mold section without resort to the vacuum source 100.

After the upper initial mold section 22 has thus been raised to its open position, the motor 97 is energized to drive the lower final mold section 34 to its broken line transfer position of FIGURE 1, below the elevated upper initial mold section 22. In this transfer position, the mold cavity 40 in the final mold section 34 directly underlies and opens upwardly toward the plastic sheet S currently supported on the upper initial mold section 22. The plastic sheet is now deposited on the underlying final mold section 34 by lowering the upper mold section to its broken line position of FIGURE 1, wherein the sheet contacts the lower mold section and then reversing the valve 104 to communicate the pressurized air source 102 to the passages 70 in the upper initial mold section 22. The resulting air pressure in these passages forces the soft plastic sheet S from the upper mold section 22 onto the underlying lower mold section 34. Thereafter, the initial mold section 22 is again raised to its solid line open position of FIGURE 1, and the motor 97 is reversed to return the final mold section 34, and the plastic sheet S thereon to the final forming station 16.

The final phase of the plastic forming cycle of the illustrated plastic forming apparatus 10 involves pressurizing of the upper end of the final mold ram cylinder 106 to lower the upper final mold section 26 to its closed position on the lower final mold section 34. During this closing of the final mold sections, the soft plastic sheet S is formed to a final shape in the final mold cavity 40. The illustrated mold cavity 40 is designed to produce an egg carton of the kind shown in FIGURE 11 and having upper and lower portions which are integrally joined by a connecting web that may be subsequently crushed or otherwise weakened to form a hinge connection between the carton portions.

In actual practice, the forming apparatus 10 is operated in such a way as to cause its several operating phases, discussed above, to proceed in sufficiently rapid sequence to enable transfer of the sheet S from the initial mold cavity 26 to the final mold cavity 40 and forming of the sheet to its final shape in the latter cavity while the sheet is still in its soft plastic forming state. It is obvious at this point that the plastic forming apparatus 10 may conceivably be automated by combining the apparatus with a suitable automatic control system which is programmed to effect the operating cycle described above. As noted earlier, while the illustrated apparatus utilizes heat lamps as the heat source 30 for fusing the plastic beads B within the initial mold cavity 26 and maintaining the resulting plastic sheet S in the proper soft plastic forming state, other means may be employed for thus fusing the beads and heating the sheet. For example, the requisite heat may be generated by acoustic means, by electrical heaters, by steam, or in any other conventional manner. Moreover, other types of gating devices and actuators than those illustrated may be employed for gating a measured quantity of the plastic beads B into the initial mold cavity 26 and driving the lower final mold section between its normal and transfer positions. It is also obvious that while the illustrated apparatus utilizes plastic material which is supplied in bead form and fuses the plastic beads to sheet form within the initial mold cavity 26, the machine may utilize preformed plastic sheets. In this case, the plastic sheets are merely heated to the proper soft plastic forming state within the initial mold cavity 26 and thereafter formed to the final shape within the final mold cavity 40.

It is now obvious that the present invention may utilize various types of plastics and various final mold shapes. Accordingly, the earlier reference to the use of polystyrene plastic beads and to a final mold cavity shape for producing cellular egg cartons should be regarded as merely illustrative and not limitative in nature.

In order to provide a full and complete understanding of the invention, there are set forth below three examples specifying the various parameters involved in typical operating or plastic forming cycles of the machine when utilizing polystyrene plastic beads.

EXAMPLE 1

Heat source: Infrared lamps.
Distance of lamps from intial mold cavity: 8″.
Thickness of initial mold cavity: ⅛ inch.
Material: Polystyrene beads 2–3 lbs. per cubic foot.
Effective fusion temperature in initial mold cavity: 180° F.
Fusion time in initial mold cavity: 2–10 minutes.

EXAMPLE 2

Heat source: nine 500-watt floodlamps.
Distance from initial mold cavity: 5″.
Thickness of initial mold cavity: ⅛ inch.
Material: Polystyrene beads 2–3 lbs. per cubic foot.
Effective fusion temperature in initial mold cavity: 250° F.
Fusion time in initial mold cavity: 10 seconds.

EXAMPLE 3

Heat source: nine 500-watt floodlamps.
Distance from initial mold cavity: 5″.
Thickness of initial mold cavity: ⅛″.
Material: Polystyrene beads 2–3 lbs. per cubic foot.
Effective fusion temperature in initial mold cavity: 285° F.
Fusion time in initial mold cavity: 3 seconds.

The unique construction of the initial mold 18 constitutes an important feature of the invention. In general terms, this mold will be observed to comprise a body formed by the separable mold sections 20, 22 and containing a mold cavity 26. One wall of this cavity, i.e., plate 52, is constructed of a material such as glass, which is transparent to radiant heat from a heat lamp or other radiant heat source. The opposite wall of the cavity, i.e., sheet 56, reflects radiant heat incident thereon. This unique mold construction may be employed to fuse plastic beads into any desired shape by providing the mold cavity 26 with an appropriate corresponding shape. As noted earlier, the mold construction possesses the advantage that radiant heat from the radiant heat source is transmitted through the transparent wall of the mold cavity directly into the mass of plastic beads within the cavity and any radiant heat incident on the opposite reflective wall of the cavity is reflected back into the bead mass, thus to achieve rapid and uniform fusion of the beads with a convenient, compact, and low cost heat source, such as heat lamps.

Various other modifications are contemplated by those skilled in the art without departing from the spirit and scope of the invention as hereinafter defined by the appended claims.

What is claimed is:
1. Plastic forming apparatus comprising:
  a frame having an initial forming station and a final forming station;
  an initial mold at said initial forming station including a pair of separable mold sections mounted on said frame for relative movement between open and closed positions;
  said mold sections when closed defining a generally flat mold cavity for containing a sheet of thermoplastic material;
  first operating means on said frame for effecting relative movement of said mold sections between said open and closed positions;
  a heat source on said frame at said initial forming station for heating said sheet in said mold cavity to a soft plastic forming state;
  a final mold at said final forming station including a pair of separable mold sections mounted on said frame for relative movement between open and closed positions;
  said second mold sections when closed defining a final mold cavity of different shapes than said initial mold cavity;
  second operating means on said frame for effecting relative movement of said final mold sections between open and closed positions;
  transfer means on said frame for effecting transfer of said plastic sheet while still in said plastic forming state from said initial mold cavity to said final mold cavity;
  said transfer means comprising means for retaining said plastic sheet in contact with one initial mold section during relative movement of said initial mold sections to their open positions, means for effecting relative movement of said one initial mold section and one final mold section to and from transfer positions opposite one another, and means for effecting transfer of said sheet from said one initial mold section to said one final mold section while said latter mold sections are in said transfer positions.

2. Plastic forming apparatus according to claim 1 wherein:
said one final mold section is movable along said frame relative to said one initial mold section to and from a transfer position between said initial mold sections.

3. Plastic forming apparatus comprising:
a frame having an initial forming station and a final forming station;
an initial mold at said initial forming station including a pair of separable mold sections mounted on said frame for relative movement between open and closed positions;
said mold sections when closed defining a generally flat mold cavity for containing a sheet of thermoplastic material;
first operating means on said frame for effecting relative movement of said mold sections between said open and closed positions;
a heat source on said frame at said initial forming station for heating said sheet in said mold cavity to a soft plastic forming state;
a final mold at said final forming station including a pair of separable mold sections mounted on said frame for relative movement between open and closed positions;
said second mold sections when closed defining a final mold cavity of different shapes than said initial mold cavity;
second operating means on said frame for effecting relative movement of said final mold sections between open and closed positions;
transfer means on said frame for effecting transfer of said plastic sheet while still in said plastic forming state from said initial mold cavity to said final mold cavity;
one of said initial mold sections comprising a transparent wall; and
said heat source comprising a source of radiant heat located opposite said transparent wall for transmitting radiant heat through said wall to the interior of said initial mold cavity.

4. Plastic forming apparatus according to claim 3 wherein:
the other initial mold section comprises an inner reflective surface facing said transparent wall for reflecting radiant heat incident on said surface back into said initial mold cavity.

5. Plastic forming apparatus comprising:
a frame having an initial forming station and a final forming station;
an initial mold at said initial forming station including a pair of separable mold sections mounted on said frame for relative movement between open and closed positions;
said mold sections when closed defining a generally flat mold cavity for containing a sheet of thermoplastic material;
first operating means on said frame for effecting relative movement of said mold sections between said open and closed positions;
a heat source on said frame at said initial forming station for heating said sheet in said mold cavity to a soft plastic forming state;
a final mold at said final forming station including a pair of separable mold sections mounted on said frame for relative movement between open and closed positions;
said second mold sections when closed defining a final mold cavity of different shapes than said initial mold cavity;
second operating means on said frame for effecting relative movement of said final mold sections between open and closed positions;
transfer means on said frame for effecting transfer of said plastic sheet while still in said plastic forming state from said initial mold cavity to said final mold cavity;
plastic bead supply means communicating with said initial mold cavity for introducing a measured quantity of thermoplastic beads into said initial mold cavity; and
said heat source including means for heating the plastic beads within said initial mold to their fusion temperature, thus to fuse said beads into a sheet within said initial mold cavity.

6. Plastic forming apparatus comprising:
a frame having an initial forming station and a final forming station spaced therealong;
an initial mold at said initial forming station including a lower mold section rigid on said frame and an upper mold section overlying said lower mold section and vertically movable between open and closed positions relative to said lower mold section;
operating means on said frame at said initial forming station connected to said upper mold section for moving said latter section between said open and closed positions thereof;
said mold sections when closed defining a generally flat initial mold cavity;
plastic bead supply means communicating with said initial mold cavity for introducing a measured quantity of fusible thermoplastic beads into said cavity;
a heat source on said frame at said initial forming station for heating the plastic beads to their fusion temperature within said initial mold cavity, thus to form a molded plastic sheet within said cavity, and maintaining said sheet in a soft plastic forming state;
a final mold at said final forming station including a lower mold section and an upper mold section vertically movable between open and closed positions relative to said final lower mold section;
said final mold sections when closed defining a final mold cavity having a different shape than said initial mold cavity;
operating means on said frame at said final forming station connected to said upper final mold section for moving the latter mold section between open and closed positions relative to said lower final mold section;
means supporting said lower final mold section on said frame for movement therealong when said upper mold sections occupy their open positions between a normal position below said upper final mold section and a transfer position below said upper initial mold section; and
means for causing said plastic sheet to adhere to said upper initial mold section when the latter section is raised to its open position and thereafter effecting transfer of said sheet from said upper initial mold section to said lower final mold section when the latter occupies said transfer position thereof, in such manner that said plastic sheet remains in its soft plastic state during said transfer and subsequent return of said lower final mold section to its normal position, thus to permit forming of said sheet to a final shape within said final mold cavity while still in said soft plastic forming state by movement of said upper final mold section to its closed position relative to said lower final mold section following return of the latter section to its normal position.

7. Plastic forming apparatus according to claim 6 wherein:
said plastic bead supply means comprise a hopper adapted to contain a supply of plastic beads and communicating with said initial mold cavity, means for evacuating said initial mold cavity to draw plastic beads from said hopper into said initial mold cavity, and gate means for controlling the quantity of plastic beads entering said initial mold cavity from said hopper.

8. Plastic forming apparatus according to claim 6 wherein:
said transfer means comprise passage means opening through the underside of said upper initial mold section, a vacuum source, and means for communicating said vacuum source to said passage means, thus to cause said plastic sheet to adhere to said upper initial mold section.

9. Plastic forming apparatus according to claim 6 wherein:
said transfer means comprise passage means opening through the underside of said upper initial mold section, a pressurized air source, and means for communicating said air source to said passage means to force said plastic sheet from said upper initial mold section to said lower final mold section when the latter section occupies its transfer position.

10. Plastic forming apparatus according to claim 6 wherein:
said transfer means comprise passage means opening through the underside of said upper initial mold section, a vacuum source, a pressurized air source, and means for selectively communicating said vacuum source to said passage means to cause said plastic sheet to adhere to said upper initial mold section and communicating said air source to said passage means to force said plastic sheet from said upper initial mold section onto said lower final mold section when the latter section occupies its transfer position.

References Cited

UNITED STATES PATENTS

| | | | |
|---|---|---|---|
| 2,377,946 | 6/1945 | Leary | 18—19 XR |
| 2,493,439 | 1/1950 | Braund | 18—19 XR |
| 2,640,402 | 6/1953 | Comstock | 18—19 XR |
| 3,193,874 | 7/1965 | Jablonski | 18—5 XR |
| 3,194,047 | 7/1965 | Eggert et al. | 18—19 XR |
| 3,221,366 | 12/1965 | Couchman | 18—5 |
| 3,228,066 | 1/1966 | Rippstein | 18—19 |

WILLIAM J. STEPHENSON, Primary Examiner

U.S. Cl. X.R.

18—19